(12) United States Patent
Eakin et al.

(10) Patent No.: US 8,584,619 B2
(45) Date of Patent: Nov. 19, 2013

(54) ELECTRONIC LIVESTOCK FEEDING STATION WITH INTEGRAL SCALE ASSEMBLY

(75) Inventors: George R. Eakin, Osborne, KS (US); Jason L. Moore, Pasedena, CA (US); Ronald M. Thibault, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 152 days.

(21) Appl. No.: 13/219,595

(22) Filed: Aug. 26, 2011

(65) Prior Publication Data

US 2012/0048206 A1 Mar. 1, 2012

Related U.S. Application Data

(60) Provisional application No. 61/377,374, filed on Aug. 26, 2010.

(51) Int. Cl.
*A01K 1/10* (2006.01)

(52) U.S. Cl.
USPC .......................................... 119/515; 119/511

(58) Field of Classification Search
USPC .............. 119/515, 840, 842, 518, 51.02, 511, 119/14.03, 14.18
See application file for complete search history.

(56) References Cited

U.S. PATENT DOCUMENTS

| | | | |
|---|---|---|---|
| 4,280,448 A * | 7/1981 | Ostermann | 119/842 |
| 4,303,039 A | 12/1981 | Thibault | |
| 4,353,329 A | 10/1982 | Thibault | |
| 4,462,338 A | 7/1984 | Thibault | |
| 4,517,923 A * | 5/1985 | Palmer | 119/51.02 |
| 4,533,008 A | 8/1985 | Ostermann | |
| D285,498 S | 9/1986 | Thibault | |
| 4,617,876 A * | 10/1986 | Hayes | 119/842 |
| 5,673,647 A | 10/1997 | Pratt | |
| 5,730,355 A | 3/1998 | Lessard et al. | |
| 5,778,820 A * | 7/1998 | van der Lely et al. | 119/14.18 |
| 5,924,922 A | 7/1999 | Eakin et al. | |
| 5,988,106 A * | 11/1999 | van den Berg | 119/51.02 |
| 6,135,055 A | 10/2000 | Pratt | |
| 6,177,271 B1 | 1/2001 | Butts et al. | |
| 6,199,511 B1 | 3/2001 | Thibault | |
| 6,539,896 B1 * | 4/2003 | Larsen | 119/515 |
| 6,666,816 B2 | 12/2003 | Mountain | |
| 6,748,898 B2 * | 6/2004 | Ulman et al. | 119/57.92 |
| 6,837,190 B2 | 1/2005 | Thibault et al. | |
| 6,868,804 B1 * | 3/2005 | Huisma et al. | 119/842 |
| 6,899,044 B2 * | 5/2005 | Thibault et al. | 119/51.02 |
| 6,974,373 B2 * | 12/2005 | Kriesel | 452/157 |

(Continued)

*Primary Examiner* — Yvonne Abbott
(74) *Attorney, Agent, or Firm* — Jeffrey L. Thompson; Thompson & Thompson, P.A.

(57) ABSTRACT

A livestock feeding station includes an entrance raceway, an exit raceway arranged at an angle relative to the entrance raceway, and a feeder located at an intersection between the entrance and exit raceways. A feed dispensing mechanism selectively dispenses an allotted amount of feed into the feeder. A scale assembly having a platform located in the entrance raceway is used to individually weigh animals within the feeding station. The scale assembly includes a hinged scale platform to allow for easy cleaning, and a cantilevered scale platform extension that extends past an end of the entrance raceway and the feeder to provide a weighing platform assembly that continues to hold an entire animal during normal feeding functions. The scale assembly also includes a basket assembly construction to ensure that an accurate weight measurement can be made even if an animal is leaning against a back or front side of the station.

19 Claims, 10 Drawing Sheets

(56) References Cited

U.S. PATENT DOCUMENTS

| | | |
|---|---|---|
| 6,981,649 B2 | 1/2006 | Jaeger et al. |
| 7,026,939 B2 * | 4/2006 | Letkomiller et al. ...... 340/572.7 |
| 7,039,220 B2 * | 5/2006 | Kriesel .................... 382/110 |
| 7,210,428 B2 | 5/2007 | Thibault |
| 7,444,961 B1 * | 11/2008 | Ellis .................... 119/842 |
| 7,516,905 B2 | 4/2009 | Jaeger et al. |
| 8,169,324 B2 * | 5/2012 | Kuzniar et al. ............ 340/573.1 |
| 8,261,694 B2 * | 9/2012 | Pratt .................... 119/51.02 |
| 2002/0147381 A1 | 10/2002 | Kolarovic |
| 2003/0226518 A1 | 12/2003 | Thibault et al. |
| 2003/0226522 A1 | 12/2003 | Thibault |
| 2005/0028752 A1 | 2/2005 | Thibault et al. |
| 2006/0016899 A1 | 1/2006 | Jaeger et al. |
| 2006/0202835 A1 | 9/2006 | Thibault |
| 2007/0193523 A1 | 8/2007 | Thibault |
| 2007/0277748 A1 | 12/2007 | Thibault |

\* cited by examiner

ELECTRONIC LIVESTOCK FEEDING STATION WITH INTEGRAL SCALE ASSEMBLY

RELATED APPLICATIONS

This application claims the benefit of U.S. Provisional Patent Application No. 61/377,374 filed on Aug. 26, 2010. The entire contents of this provisional application are incorporated herein by reference.

BACKGROUND OF THE INVENTION

1. Field of the Invention

The present invention relates generally to livestock feeding systems and, in particular, to livestock feeding stations with scale assemblies.

2. Description of the Related Art

Meat packers and their customers are demanding the production and delivery of market animals with weights that must meet progressively tighter windows for acceptable weights. Marketing animals, whose weights fall outside the specified weight ranges usually result in significant deductions from market prices for such underweight or overweight animals. Historically pig producers selected animals for market by simple visual inspection relying on pig judging skills to identify market animals. Such methods are neither sufficiently accurate nor reliably consistent for modern markets.

Producers are also increasingly conscious that underfeeding or overfeeding not only hurts their bottom line profitability, but feeding a feed that is not optimum each phase of the growth cycle unnecessarily burdens them with waste nutrient disposal costs and regulatory review. To manage feed, phase feeding is increasingly employed changing feed composition to match growth utility at multiple intervals during the growth cycle. These changes are best accomplished with an accurate understanding of the daily weight distribution and its rate of change for the animals. Although visual inspection or fixed calendar-based growth curves have usually been the methods used to make phase feed changes, visual inspection is approximate at best, and growth curves do not take into account the effects of environmental temperatures, pen stocking densities or other factors that affect actual rate of gain.

Although using scales to weigh market animals or measure weight distributions is clearly desirable, manually weighing one animal at a time requires substantial labor and time, two commodities that are often unavailable in a modern finishing operation. Furthermore, manually weighing animals that fail to meet the marketing range always causes a temporary, but costly interruption to their normal growth. For phase feed changes, manually weighing of small samples of the pen is the only practical method but is not really much more accurate than visual estimating. If large numbers of animals must be inspected, the use of manual single-animal scales is simply too slow to be practical. Therefore, the implementation of an automated weighing system would increase efficiencies. The first step in automated weighing must be to spread the cost and equipment maintenance over a large number of animals. This consideration leads naturally to the conclusion that managing finishing pigs in large pens is highly desirable.

The use of individual gestation stalls or crates in environmentally controlled barns has generally become the accepted standard method for sow management, gradually replacing earlier group methods such as pasture gestation or small pen gestation of groups of 6 to 10 sows. Although gestation crates solve many management problems by eliminating agonistic sow interactions, crates are far from perfect, e.g. control of feed intake is insufficient to prevent excessive variability in sow condition, and recently in Europe gestation crates have become unacceptable owing to public perceptions of sow well-being.

Over the years, many studies attempted to understand how feeding of sows in groups could be managed with automated systems. One of these methods, Electronic Sow Feeding (ESF), uses an electronic feeding station that isolates each animal as they are sequentially fed by an automatic feed dispenser. Many reviews of these studies exist. These studies were mostly directed to the use of electronic feeding stations with small groups of sows or with single large groups with dynamic mixing. Osborne Industries initiated a study of electronic feeding stations about 20 years ago to understand animal behavior and performance in large groups of animals without mixing (static groups).

Electronic feeding stations for animals are known in the prior art. A typical electronic feeding station allows one animal to enter the station and eat its allotted feed amount without competition from other animals in a group managed system. For example, an electronic feeding station may have an entry gate which restricts entry to one sow at a time, a protected race, a feed bowl, an exit way with a one-way gate to prevent entry of animals as the eating sow leaves, and a feed and water dispensing mechanism with a feed hopper and feed station controller connected to a PC in a control room. Groups of sows, typically 50 to 60, are fed sequentially by the electronic feeding station.

The applicants have discovered that maintaining a farrowing group (i.e. sows with similar expected farrowing dates) together as much as possible is advantageous because it avoids the social adjustment that arises when new animals are introduced into a group. This practice works well for sow farms that manage increments of 1,200 sows because typically 50 sows are farrowed each week in such a farm (or 100 for a 2,400 sow farm, 150 for a 3,600 sow farm, etc.). For such a farm, typically 62 to 65 animals are bred with the expectation that about 20-25% of the sows will recycle and not maintain their pregnancy. Thus a farrowing group may start with 62 to 65 animals in the group, but by the end of the 114-day gestation period, only about 50 animals remain in the group. This group size fits the capacity of one typical electronic feeding station perfectly because up to about 65 animals can be fed by one electronic feeding station in a day without overloading the station. When the size of the sow farm does not permit optimum group sizes, then the electronic feeding stations are underutilized and less economic, or group mixing must occur which creates undesirable behavior between animals and difficulties for the farmer.

The mechanical parts of the electronic feeding station equipment experience very high rates of use in large groups and should be mechanically robust. Mechanical failure may create unacceptable habits of animal behavior very quickly and these habits may persist even after correction of failures. Repair should be easy and quick to avoid the possibility of establishing bad habits. Poor or weak mechanical design may attract destructive attention of animals in groups and should be avoided. In particular, the feed dispenser must be accurate without vibration or sow-induced spillage. Feed should be delivered at a rate that closely matches eating speed. This may be done automatically by assigning each animal to a feed curve, which establishes daily quantity and speed of feed delivery appropriate to its parity and production state. Addition of water to the feed bowl with each feed drop may be important to increase eating and reduce feed waste. The total weight of water should be adjustable and may be about equal the total weight of feed and may be dispensed uniformly with the feed. The electronic feeding station should be self-contained and capable of operating without continuous supervision of a personal computer by a human operator. The software that controls the electronic feeding station system should reliably manage the equipment and the data that the system generates. The electronics that connect the mechanical equipment power and conveys data to and from the software or handheld data loggers in the barn should also be robust. The electronic parts of the system should be protected from corrosive environments and from harmful power fluctuations. The electronics design should enable quick repair by semi-skilled service personnel.

Problems with existing electronic feeding station designs is that the animals weight data is not automatically connected to either the composition or type of feed the animal consumes nor the amount of feed the animal consumes. Currently the amount of food that is provided to the animal is based upon preset parameters retained in the controller software after the animal's RFID tag is read by the RFID antenna. In known operations where electronic feeding stations have been utilized, the electronic feeding station is separate from the weighing scale. This type of disconnected system does not allow for efficient data collection and comparison of food performance on weight data. This is particularly apparent when trying to collect weight data on a large animal population where several different food compositions are being examined. Another problem with some traditional feeders is competition among animals for food. In these situations the dominant animals in a group have no incentive to leave and can easily control access to the feeder and intimidate less aggressive animals. This type of behavior may lead to a wider spread of weights in the group and a longer time to market with higher facilities utilization costs.

Known electronic feeding station designs reduce or remove the competition for food creating a more relaxed environment for the animal to eat since only one animal can eat from the electronic feeding station at any given time. In this environment the animal is protected inside the confines of the electronic feeding station and can continue to eat without interruption until a specific animal's daily feed quota is met. If the same animal reenters the electronic feeding station after their quota is met then the controller will automatically open the door after obtaining the animal's identification number from its RFID tag. In this case, the entry door will remain open until the animal exits the electronic feeding station voluntarily or is physically moved out of the electronic feeding station by another incoming animal.

Genetics providers are also looking for more accurate methods for measuring the performance of various genotypes in relationship to environmental stimuli including without limitation (i) feed composition; (ii) methods of feeding; (iii) weight gain; (iv) birth statistics; and (v) and other key performance indicator values. Feed producers are also looking for more accurate methods for measuring the performance of various feed compositions to such parameters including without limitation (i) weight gain; (ii) birth statistics; (iii) percent return to estrus; (iv) 7 days post wean; (v) percent farrowing rate; (vi) litter birth weight; and (vii) litter wean weight.

Thus there is a need in the industry for an improved electronic feeding station that solves these problems.

SUMMARY OF THE INVENTION

The present invention solves the problems described above by incorporating a scale assembly into the electronic feeding station. A scale assembly having various components suitable for use in the present invention is known and is described in U.S. Pat. No. 4,533,008, the contents of which are incorporated herein by reference. Having the scale assembly incorporated directly into the electronic feeding station allows for facile comparison of food performance on weight gain in relationship to the animals genetic profile or genotype. By integrating the scale into the electronic feeding station it is also easier for a farmer or researcher to examine the effects of food composition and food amounts on Key Performance Indicator (KPI) values including without limitation (i) percent return to estrus; (ii) 7 days post wean; (iii) percent farrowing rate; (iv) litter birth weight; and (v) litter wean weight.

The present invention solves the problems with the existing feeder stations described above and known in the prior art by fitting a scale assembly into the feeding station. The basket assembly of the scale assembly allows for accurate weighing of an animal in the feeding station by creating an environment where the animal's body is positioned over the scale platform. The basket assembly ensures that the scale can accurately measure and record the animal's weight by keeping the animal's body positioned over the scale platform. Without the basket assembly or some mechanism of similar design, construction, or operation the animal may lean against the panels of the entrance race access door or other part of the electronic feeding station not connected with the scale platform and in doing so introduce an unwanted error into the weight measurement.

According to the present invention the constructions and sections of the electronic feeding station, including the (i) exit race assembly; (ii) entrance race assembly; (iii) scale assembly; (iv) basket assembly; (v) access door; (vi) animal enclosure panel; (vii) hinged scale platform; and (viii) cantilevered scale platform extension, may be opened, tilted, or removed to allow for the following tasks: (i) cleaning; (ii) maintenance; (iii) preventive maintenance; and (iv) removal of injured or deceased animal.

The present invention incorporates a hinged scale platform and cantilevered scale platform extension into the scale assembly and basket assembly. The incorporation of the cantilevered scale platform extension allows for accurate weighing of the animal in the feeding station while the animal is located near the feeder portion of the feeding station in which case the animal's front legs and some amount of its body mass may be positioned on or over the cantilevered scale platform extension. With the incorporation of the cantilevered scale platform extension, the animal's weight may be more accurately measured while the animal is either positioned on the hinged scale platform or some portion of the animal's body spans across both the hinged scale platform and the cantilevered scale platform extension. The incorporation of a hinged scale platform is important as it allows an operator to easily clean the electronic feeding station and remove any debris, including without limitation manure or bedding that may be located under or in contact with the scale platform or cantilevered scale platform extension or some other component of the basket assembly or scale assembly.

Benefits of the present invention over existing electronic feeding stations include means for: (i) providing data about when an animal is in the proper condition to enter a breeding herd including an animal's development, age, and weight; (ii) monitoring an animal's weight based on the composition of feed in relationship to the animals genotype or genetic profile; (iii) providing data about litter weights including how much an animal weighs before and after giving birth to offspring; (iv) automating the measurement of individual feed intake and growth performance of animals; (v) providing cost effective performance testing of animals managed in groups; (vi) providing information about the performance found in commercial feeding; (vi) providing more accurate information than manual testing of animals in single pens; (vii) eliminating data collection errors and operator bias; and (viii) providing diagnostics for health and behavior not previously available by known or existing methods or equipment.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

The electronic livestock feeding station 6 according to embodiments of the present invention will now be described with reference to FIGS. 1 to 10 of the accompanying drawings.

Figure 1:
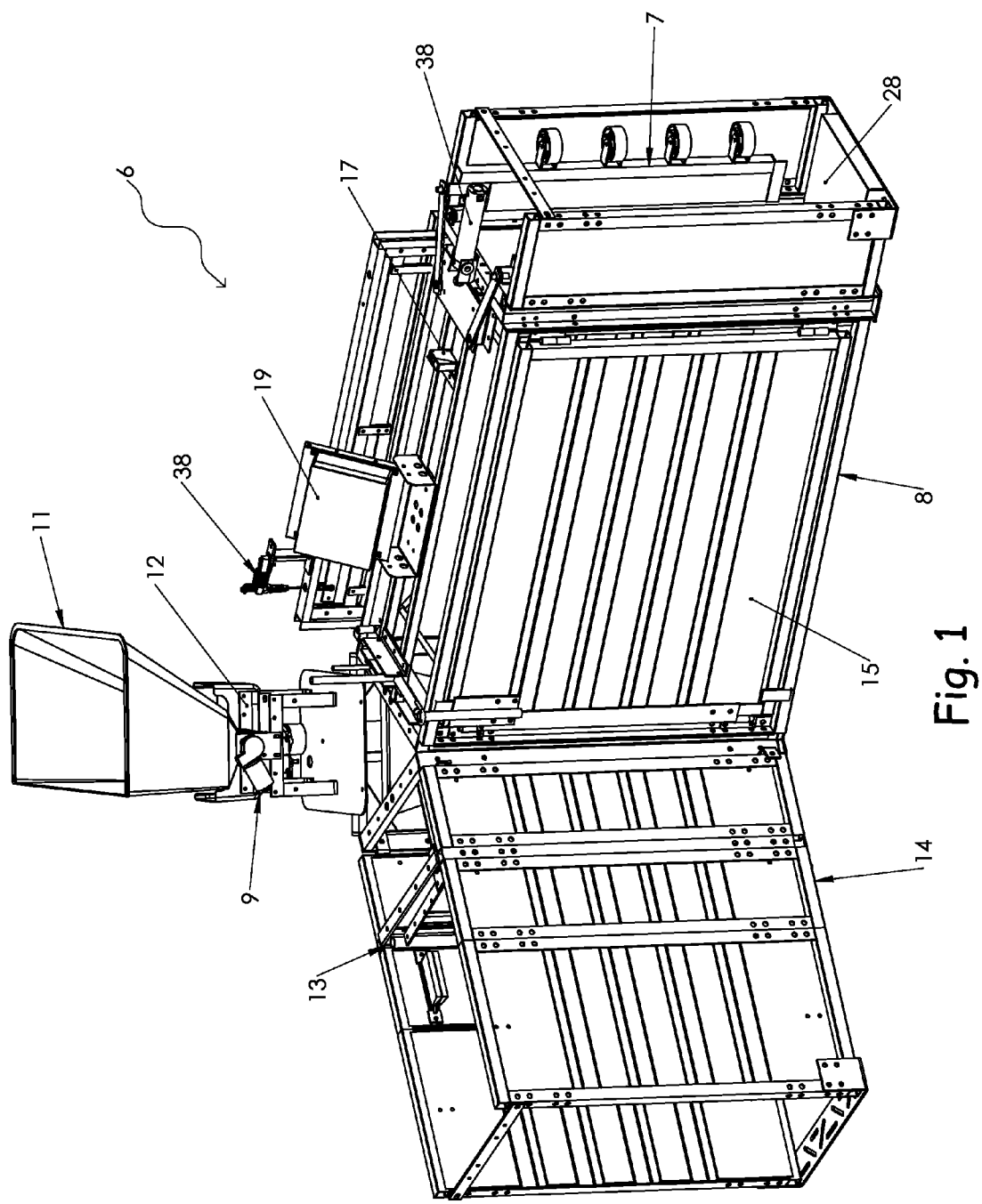
FIG. 1 is a perspective view of an electronic feeding station of the present invention.
Figure 2:
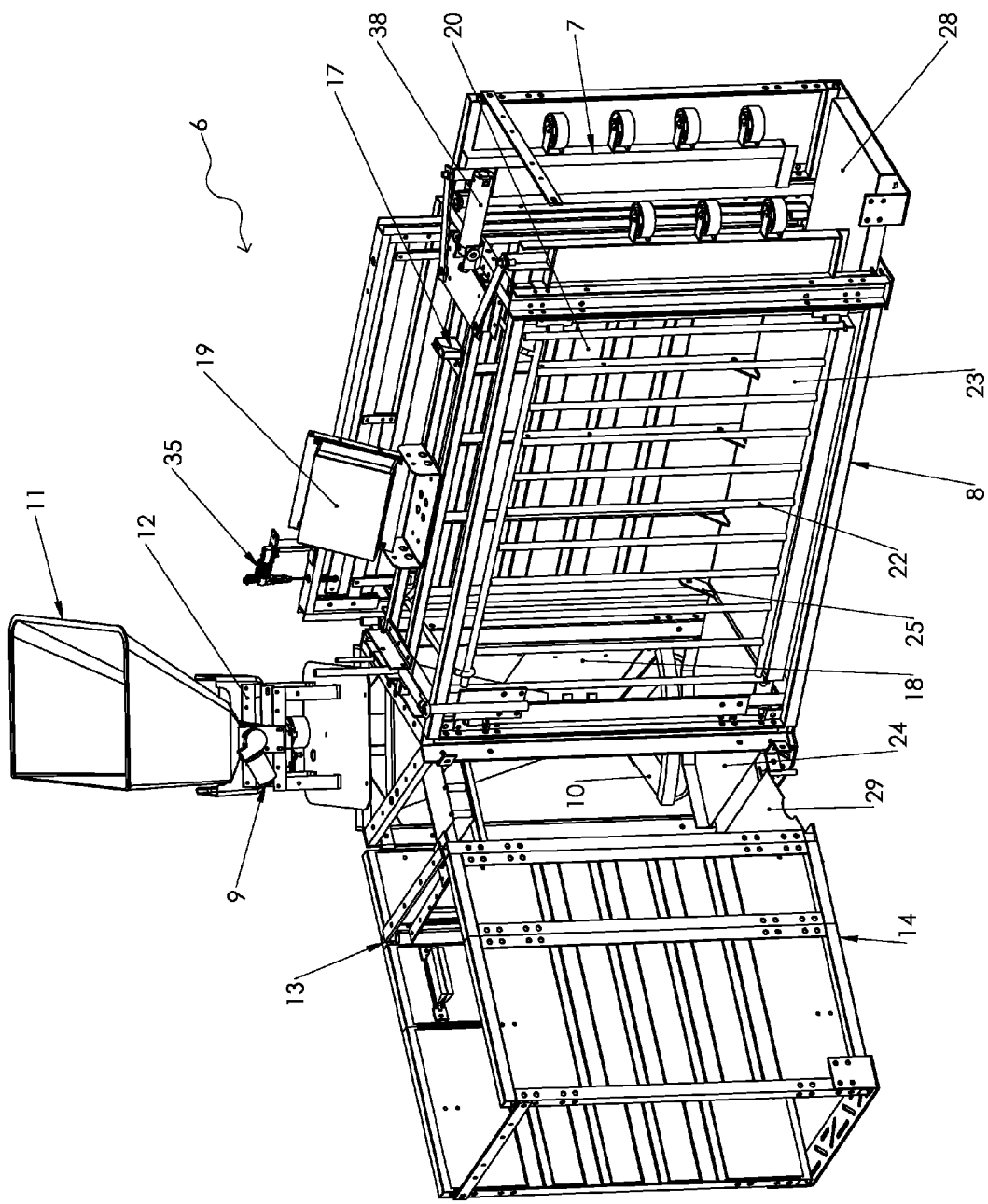
FIG. 2 is a perspective view of an electronic feeding station of the present invention with the access door to the entrance race removed, a panel on the exit race assembly removed, and showing the livestock scale assembly.
Figure 3:
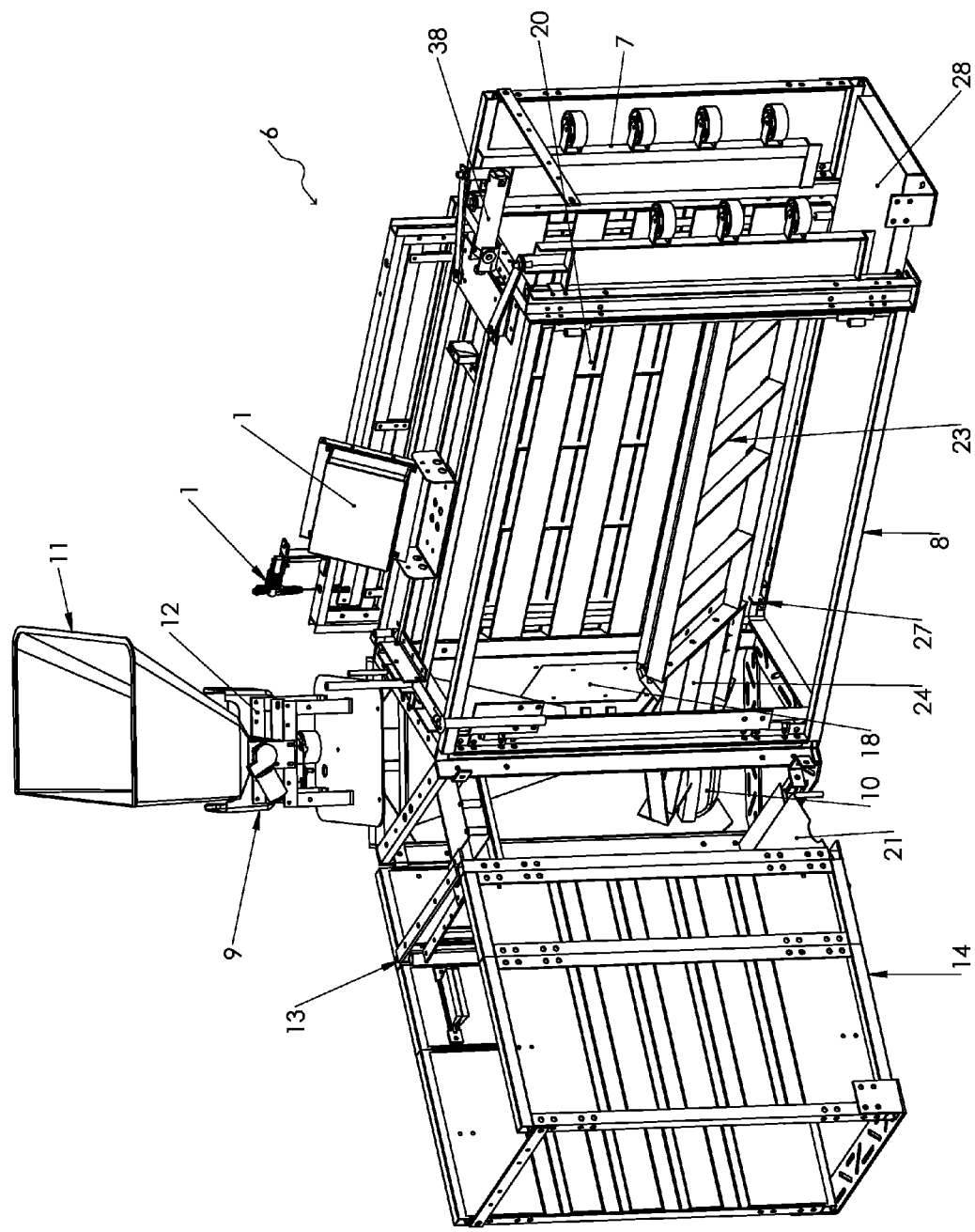
FIG. 3 is a perspective view of an electronic feeding station of the present invention with the access door to the entrance race removed, a panel on the exit race assembly removed, and showing the hinged scale platform and cantilevered scale platform extension in the folded position.

An electronic livestock feeding station 6 for use with animals is shown in FIGS. 1 to 3. A one-way entry gate 7 is provided in the feeding station 6. The entry gate 7 functions to restrict entry into the feeding station 6 to one animal at a time. The entry gate 7 may have a conventional structure known in the prior art. The entry gate 7 leads to the entrance race assembly 8, which defines an entrance raceway.

A feed dispensing system 9 is provided in the feeding station 6 after the entry gate 7 and at the end of the entrance raceway. The feed dispensing system 9 includes a feeder 10 from which the animal eats, a hopper 11 containing a supply of feed, and a mechanism 12 for selectively dispensing an allotted ration of feed from the hopper 11 into the feeder 10 for each animal entering the feeding station 6.

A one-way exit gate 13 is provided in the feeding station 6 after the feed dispensing system 9. The exit gate 13 functions to prevent entry of other animals as an animal within the feeding station 6 leaves the feeding station. The exit gate 13 is part of the exit race assembly 14, which defines an exit raceway. The exit gate 13 may have a conventional structure known in the prior art.

An access door 15 is provided in the feeding station 6 as part of the entrance race assembly 8. The access door 15 allows access to the entrance race assembly 8 and livestock scale assembly 16.

An infrared detector 17 is positioned near the first entry gate 7 for detecting the presence of an animal within the feeding station 6.

An RFID antenna 18 is positioned near the feeder 10 of feed dispensing system 9 for detecting the presence and identity of an animal within the feeding station 6.

A control system 19 is provided which receives inputs from the infrared detector 17, the RFID antenna 18, and load cell 35. The control system 19 communicates with the feed dispensing system 9 for causing a desired portion of feed to be dispensed from the hopper 11 into the feeder 10 based on (i) the detected identity of the animal; (ii) the weight of the animal; or (iii) both the identity and the weight of the animal within the feeding station 6.

Figure 4:
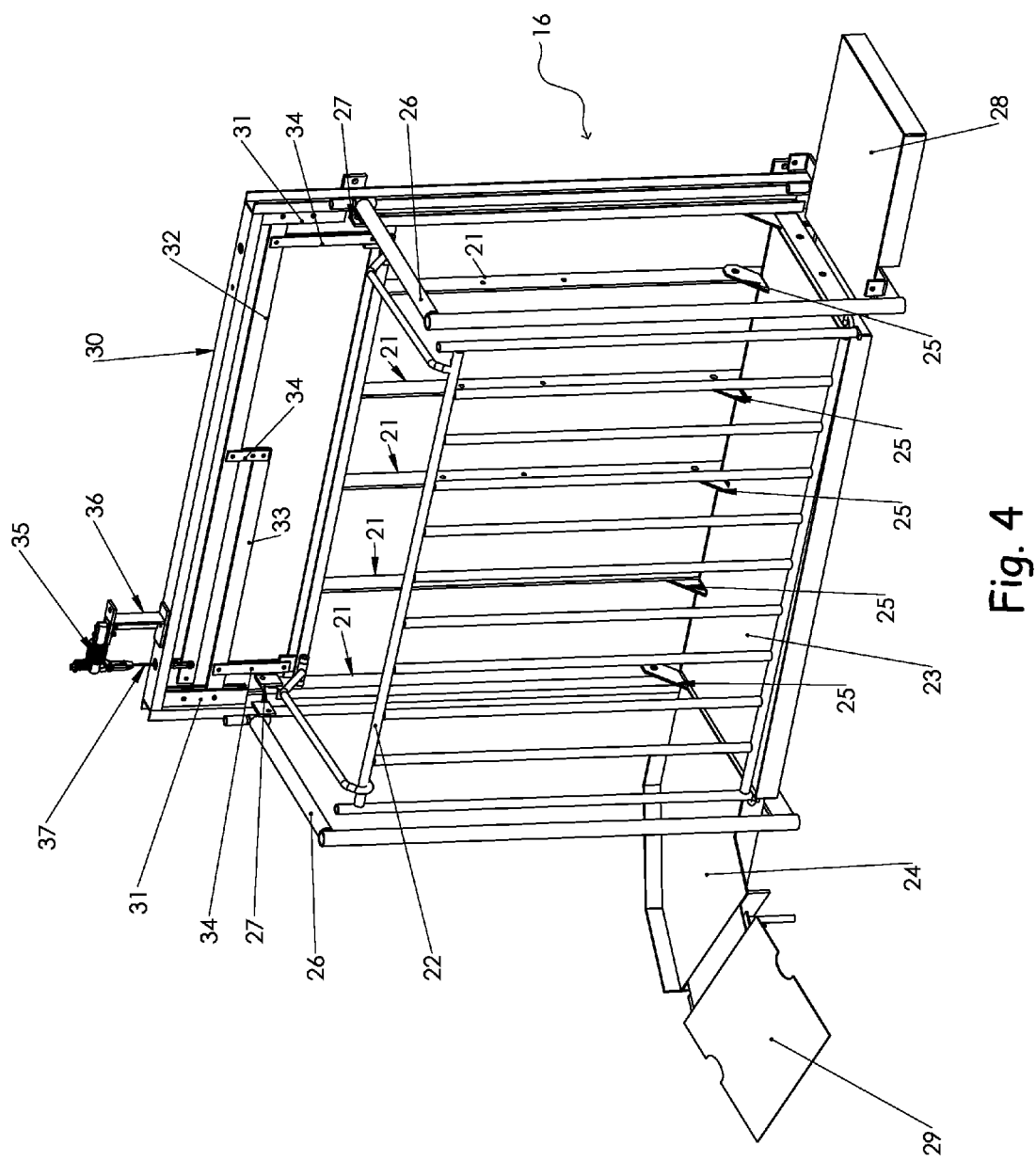
FIG. 4 is a perspective view of an electronic feeding station livestock scale assembly of the present invention.
Figure 5:
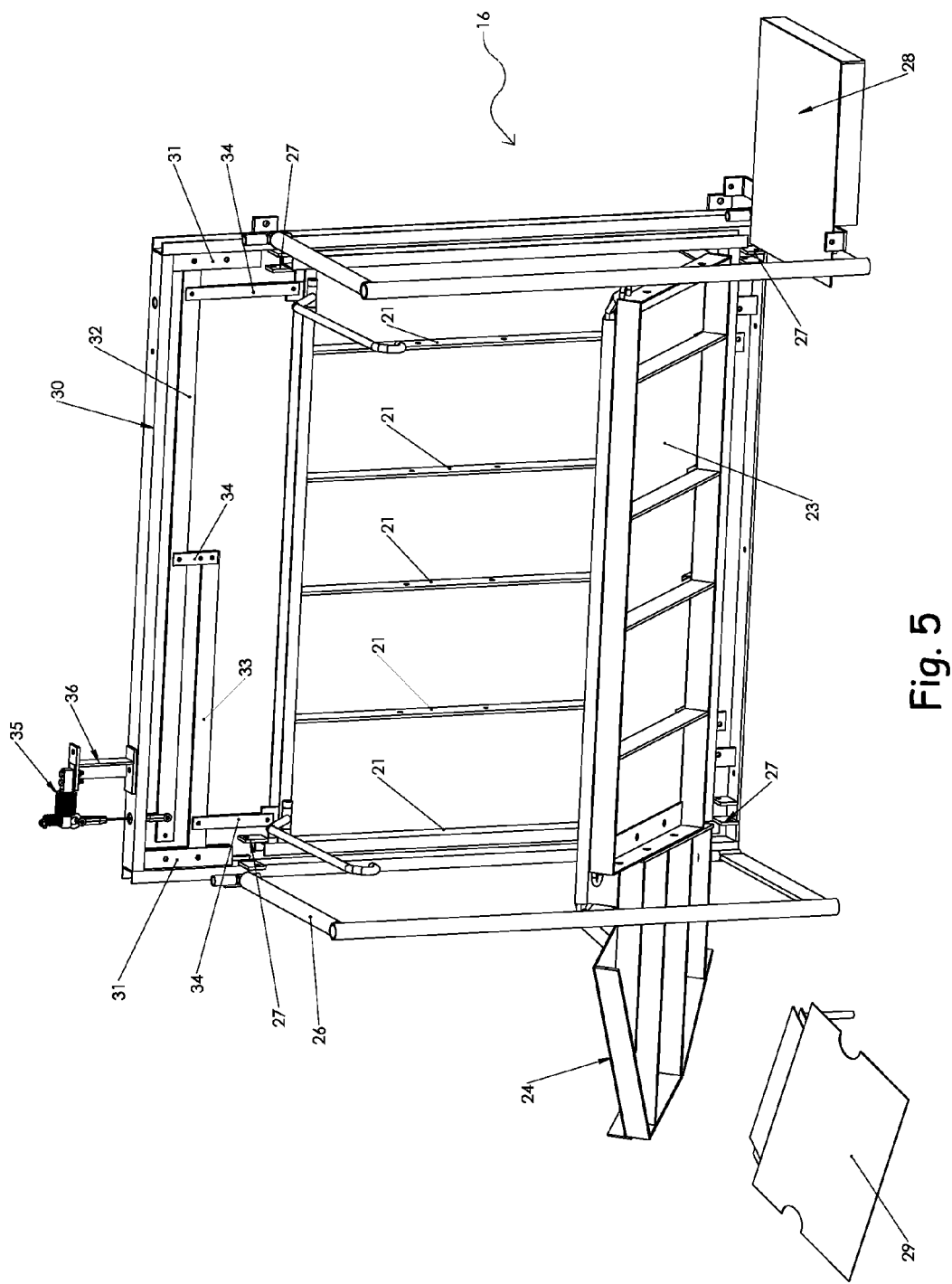
FIG. 5 is a perspective view of an electronic feeding station livestock scale assembly of the present invention with the hinged scale platform and cantilevered scale platform extension in the folded position and the animal enclosure panel removed.

The livestock scale assembly 16 is positioned between the entrance race panel 20 and the access door 15 of the entrance race assembly 8. As can be seen in FIG. 4 and FIG. 5, the livestock scale assembly 16 includes a basket assembly, a linkage system, and a load cell assembly.

The basket assembly is the part of the livestock scale assembly 16 that includes a back panel 21 with vertical slats, a front panel 22 with vertical slats, a hinged scale platform 23, and a cantilevered scale platform extension 24 connected to the hinged scale platform 23. The hinged scale platform 23 is attached to the back panel 21 by a series of hinges 25. The basket assembly is connected to stabilizing legs 26 via sway bars which are connected to sway bar tabs 27. Two of the sway bars are located at the top of the basket assembly, and the remaining four sway bars are positioned below the hinged scale platform 23. An animal enters the basket assembly by way of the entrance ramp 28. An animal exits the basket assembly by way of the scale exit ramp 29.

The construction of the basket assembly, including the back panel 21, the front panel 22, the platform 23, and the platform extension 24, all work together to ensure an accurate weight measurement of an animal within the feeding station 6. For example, if an animal leans against either the back or front panels 21, 22, the weight measurement will not be affected because the back and front panels 21, 22 are part of the basket assembly being weighed with the animal. Similarly, the platform extension 24 also forms part of the basket assembly being weighed with the animal, so the weight measurement will not be affected by an animal placing one or both of its front feet on the platform extension 24 while accessing the feeder 10.

The feeding station 6 is arranged with its entrance raceway (as defined by the entrance race assembly 8) at an angle relative to its exit raceway (as defined by the exit race assembly 14), and with the feeder 10 located at the intersection between the entrance and exit raceways. For example, the entrance raceway can be arranged at an angle relative to the exit raceway of approximately 90 to 150 degrees, and preferably at an angle of about 120 degrees, as viewed in plan view. The platform extension 24 extends in a cantilever fashion from the platform 23 past the end of the entrance raceway and slightly past the feeder 10 to the scale exit ramp 29. The platform extension 24 combined with the platform 23 provide a weighing platform assembly that continues to hold the entire animal during normal feeding functions until the animal begins to move away from the feeder 10. The platform extension 24 extends slightly past the feeder 10 and around the corner to the scale exit ramp 29 at the start of the exit raceway. The platform extension 24 also has a shape and dimension that allows it to fold upwardly with the platform 23 to facilitate cleaning and maintenance of the scale assembly 16.

The linkage system includes a top channel 30, vertical pivots 31, a long scale arm 32, a short scale arm 33, hanging links 34, and other miscellaneous component parts. The basket assembly is supported by the linkage system, which is in turn connected to the load cell assembly.

The load cell assembly includes a load cell 35, load cell mount 36, flexible load cell connector 37, and other miscellaneous component parts. The base of the load cell mount 36 is attached to the top channel 30, and the load cell 35 is attached to the top section of the load cell mount 36. The flexible load cell connector 37 connects the load cell 35 to the long scale arm 32. The load cell 35 measures the weight of the animals each time they pass through the livestock scale assembly 16. The load cell 35 may be located on the top of the linkage system so it stays clean and away from manure and debris that might interfere with its operation.

The control system 19 rapidly detects and stores the weight of each animal based on the input from the load cell 35 as the animal passes through the livestock scale assembly 16. A display screen is provided on the control system 19 to display weight information. Using the display screen and touch button input, feeding decisions can be entered manually at the feeding station 6.

It will be appreciated that certain features of the present invention described above can be changed without departing from the scope of the invention. For example, other types of actuators, such as hydraulic or electric driven actuators, can be used instead of the air cylinder 38. Additional gate assemblies could be incorporated into the above described feeding station 6 to allow more than two separate pens and groups of animals to use a single feeder station without group mixing. In addition, all or any of the features described or disclosed herein or incorporated herein by reference may also be used in this embodiment of the present invention or any embodiment of the present invention without limitation and without departing from the scope of the present invention.

The present invention may also be used with any pen layout design or building layout design or floor plans, including without limitation, those shown FIGS. 6 to 10.

Figure 6:
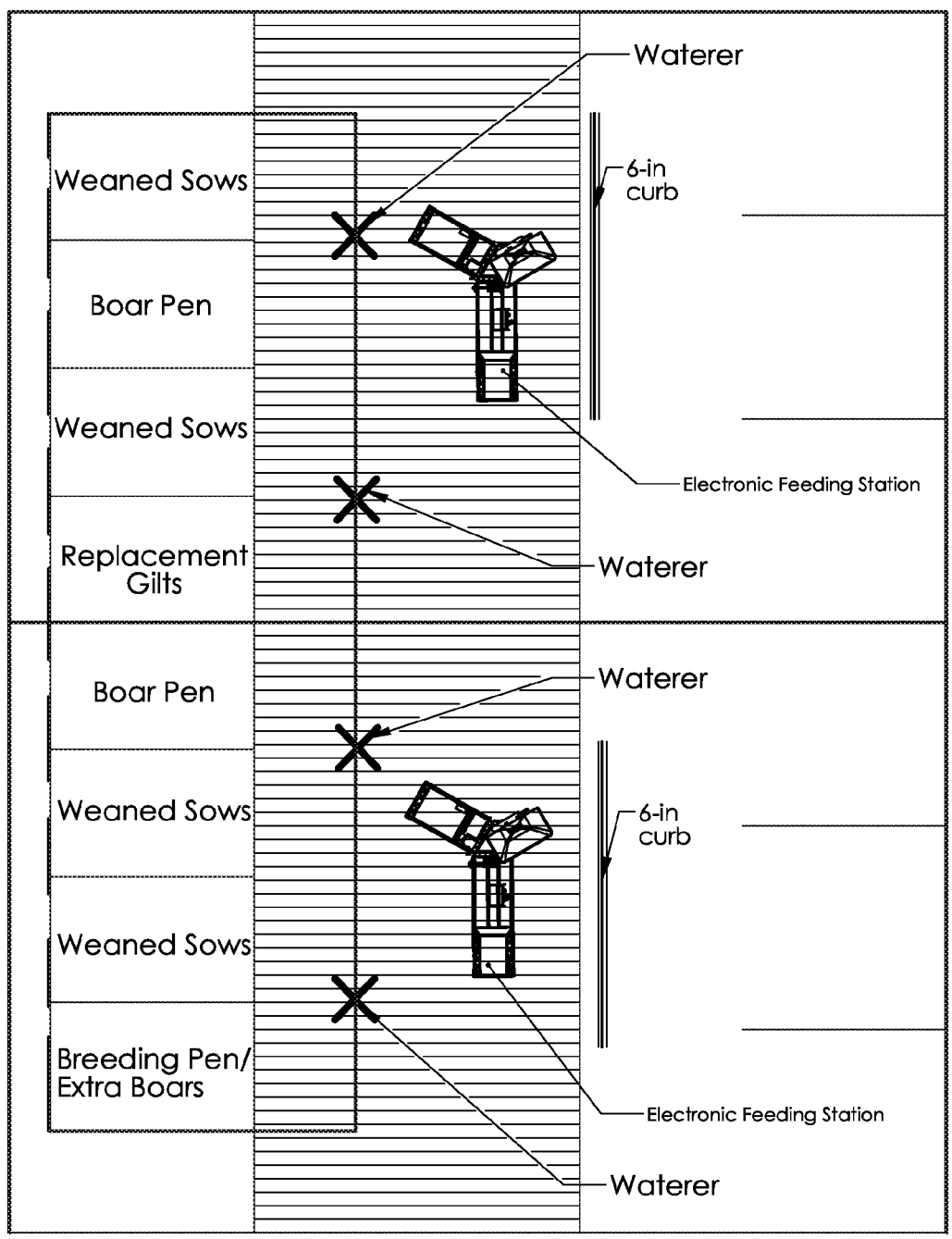
FIG. 6 is a schematic diagram of a first building plan that incorporates the electronic livestock feeding station with integral scale assembly of the present invention.

In FIG. 6, a building plan is illustrated that may be used for up to 90 animals in two 45 animal groups. In the present embodiment this plan features gestating sows that may have nose contact with boars in boar pens to assist in detecting return to estrus. Straw and alfalfa roughage may be floor-fed to sows in the lying areas from an overhead conveyor or other means. A scraper or other means may assist in moving the fibrous manure. The slats are protected from scattered roughage and debris by a 0.15 m [6-in] high curb and are shared with the weaned sow and boar pens.

Figure 7:
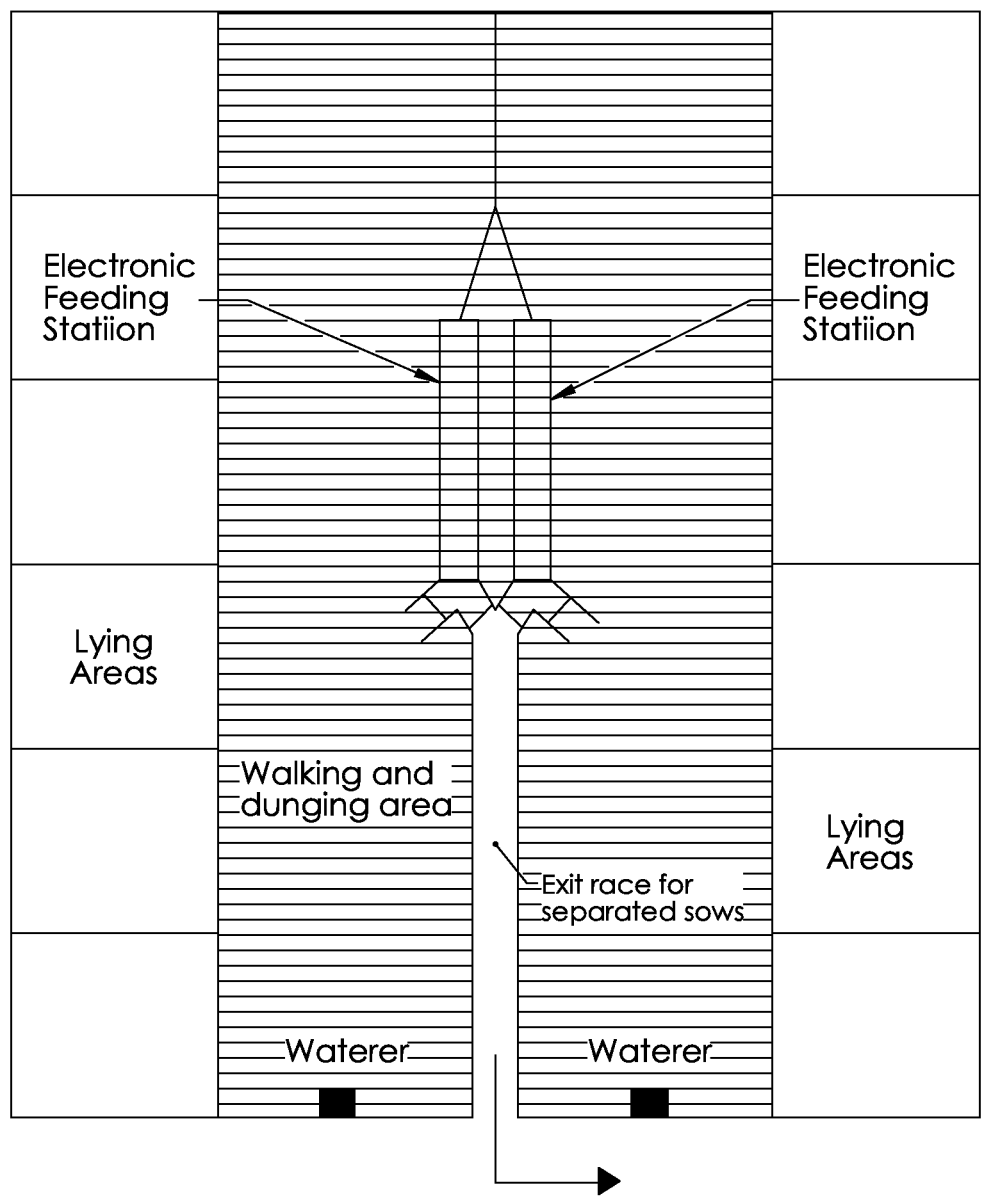
FIG. 7 is a schematic diagram of a second building plan that incorporates the electronic livestock feeding station with integral scale assembly of the present invention.

In FIG. 7, a building plan is illustrated that may be used for up to 100 animals in two 50 animal groups. This plan features an exit race leading to an attention pen (not shown). Lying areas with partitions into the barn are 0.2 m [8-in] lower than the level of the slatted area. Limited straw roughage may be floor-fed to sows in the lying areas without interfering with waste removal from the central pit.

Figure 8:
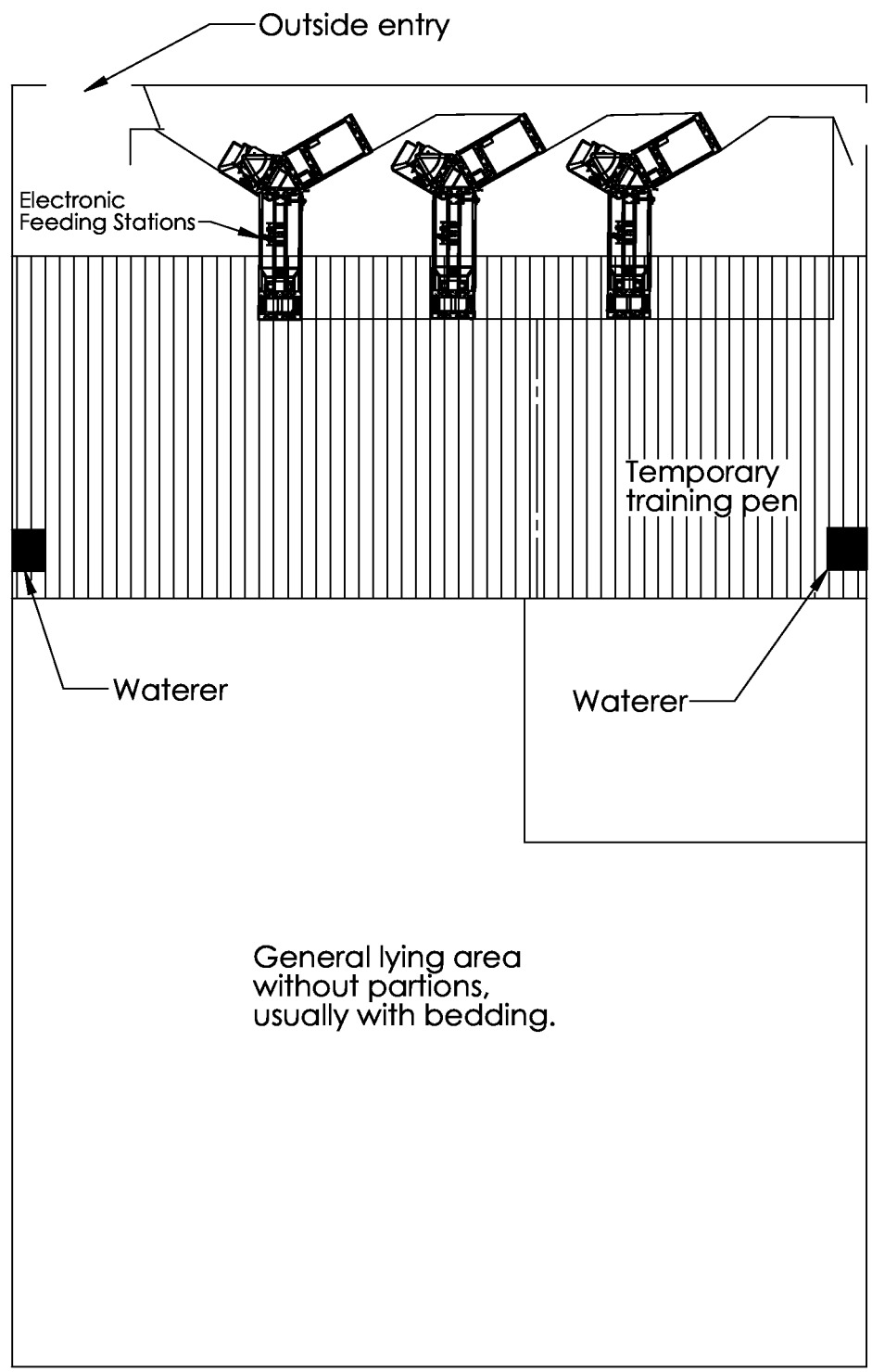
FIG. 8 is a schematic diagram of a third building plan that incorporates the electronic livestock feeding station with integral scale assembly of the present invention.

In FIG. 8, a building plan is illustrated that may be used for up to 140 animals in one group. This plan features an exit race leading to an outdoor loafing area. The lying area is open and deeply bedded with straw. Added lying partitions or roughage feeding could be options to deep bedding. Also note the arrangement of feeding stations to minimize social interactions and the temporary training pen.

Figure 9:
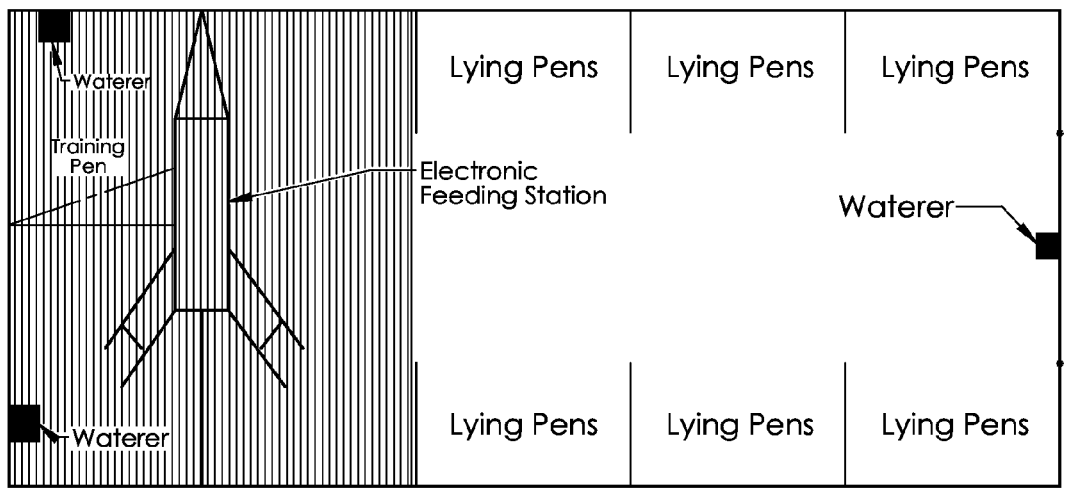
FIG. 9 is a schematic diagram of a fourth building plan that incorporates the electronic livestock feeding station with integral scale assembly of the present invention.

In FIG. 9, a building plan is illustrated that may be used for up to 50 animals. This plan features a training pen and a separation pen. Both can be removed when unused. Lying areas can be closed off if not enough sows are populating the building.

Figure 10:
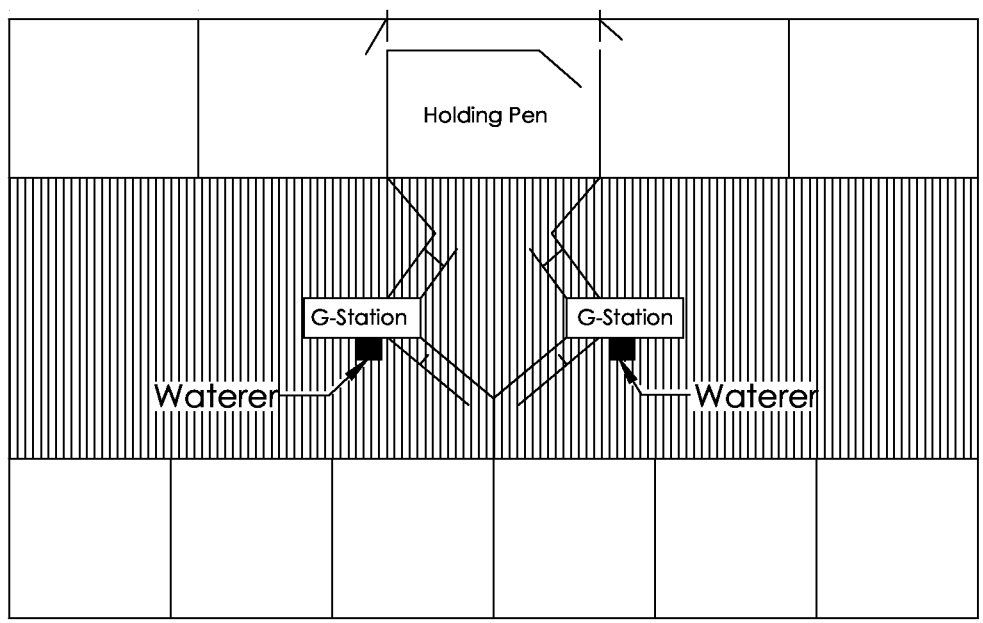
FIG. 10 is a schematic diagram of a fifth building plan that incorporates the electronic livestock feeding station with integral scale assembly of the present invention.

In FIG. 10, a building plan is illustrated that may be used for up to 50 animals. This plan features sharing a separation pen between separation stations. Lying partitions are much smaller than most designs. Station exits are lengthened.

Embodiments of the present invention may use incorporated radio frequency identification ("RFID") technology to identify and track the performance of individual animals. For example, an RFID ear tag can be attached to each animal to identify animals with superb or delayed growth. "Poor doers" can be quickly culled, saving feed and space. Accuracy of the calculated sorting weights can be improved with RFID by ensuring that each animal is counted only once per day by the control system in calculating the sorting weight. The control system can be programmed to track the individual growth curves of each animal and to signal when an animal is falling behind its expected rate of weight gain or failing to eat or drink. A marking device can be provided with the electronic feeding station and activated to mark (e.g., by spray painting) animals that need attention.

The present invention may be used with any identification logging device, including without limitation, a hand-held reader to read, including without limitation, RFID tags or barcodes. The identification logging device may be used with any wireless type connections, including without limitation, Bluetooth.

The present invention may be used in conjunction with automated estrous detection systems. The automated estrous detection system may be used for the following, without limitation: (i) automated estrous detection for gilts and sows in large pens; (ii) automated estrous detection for gilts in gilt development units; and (iii) aiding conventional estrous detection. Gilts and sows may interact with a boar through nose-to-nose contact. The automated estrous detection station reads the RFID tag on the animal and identifies the animal visiting the automated estrous detection station. The visit and length of the individual animal visit may be measured and recorded in the automated estrous detection system controller software. In addition, the automated estrous detection system may be equipped with a spray marker that marks animals in estrus. The automated estrous detection system may also be used with the following animals, including without limitation, pigs, cows, goats, and sheep. In one embodiment of the present invention, the electronic feeding station may be configured to segregate the feeding of those animals in estrus from other animals in the herd. In addition, in one embodiment of the present invention, the electronic feeding station may be configured so as to allow direct communication between the automated estrous detection system and the electronic feeding station. In another embodiment, the present invention may be used to perform the following, without limitation: measure, monitor, and record the weights of the animals in estrus or those animals in some other point in the female reproductive cycle.

The present invention may also be used in conjunction with any of the following types of feeders, including without limitation: Ad-Libitum sow feeders, nursery feeders, bulk feeders, finish feeders, and show pig feeders.

The present invention automates the measurement of animal feed intake and other performance characteristics and may be used for the following without limitation (i) evaluation of genetic potential, genetic profile, or genotype; (ii) measure individual animal performance; (iii) compare one individual animal performance against other individual animals; (iv) compare individual animal performance against the performance of the group population or specific sub-groups of the population; (v) assess management practices and procedures; (vi) determine the performance of nutritional programs and products; and (vii) evaluate and compare animal phenotype characteristics with an animal's genotype.

The present invention may be known without limitation as a walk-through design. A walk-through design enables a natural unobstructed movement of the animal through the electronic feeding station.

The present invention may be fitted with a swinging gate assembly at the entry gate to permit two groups of animals to share an electronic feeding station without mixing of the groups. Methods for using a swinging gate assembly at the entry gate to permit two groups of animals to share an electronic feeding station are known and are described in U.S. Pat. Nos. 6,837,190 and 6,899,044, the contents of each of which are incorporated herein by reference.

The present invention can be fitted with an automatic spray marker assembly for easy visual identification of animals. The spray marker assembly may include a pump, spray nozzle, a reservoir for storing the marking solution, and a mounting kit, and a connection to the controller. The spray marker may use a liquid based dye solution to mark the animals or any kind of material or solution to mark the animals. Spray marking may be activated when the animal is identified in the station by the RFID tag or other monitoring device or when the weight of the animal meets a specified weight range. The spray marker may be adjusted to mark different locations on the animals.

The present invention can be fitted with a swinging gate assembly at the exit gate to segregate animals from the herd into a separation pen for examination, treatment, or transfer to farrowing. Methods for using a swinging gate assembly at the exit gate to segregate animals from the herd are known and are described in U.S. Pat. Nos. 6,837,190 and 6,899,044, the contents of each of which are incorporated herein by reference.

The present invention can be fitted with a trough denial system. One embodiment of a trough denial system is an auto-closing trough door to prevent access to the trough by animals that have fulfilled their daily feed requirements. A trough denial system may help avoid providing residual feed to unauthorized animals. A trough denial system may be used if the settings are not correctly set for eating, or if clean-up time by the operator is needed.

The present invention can be designed to easily permit the addition of standard panel sections to lengthen the entrance or exit raceway in 0.6 m (25 inch) increments. Longer or shorter panels of any length can be easily improvised and attached. Extended entrance or exit raceways may be useful as they may discourage competition between animals at the entrances or exits. Entrance and exit raceways of various lengths may also reduce return visits to the station by the animals after feeding.

The present invention allows for varying the amount of food that is provided to an animal to be based upon, including without limitation (i) the data provided solely as part of the RFID system; (ii) the weight data of the animal obtained solely from the scale; or (iii) both the weight data of the animal obtained from the scale and the data provided as part of the RFID system. With this data the controller may automatically adjust the amount of food that is provided to an animal.

The present invention may be used with any type of animal, including without limitation, pigs, cows, goats, and sheep.

The present invention can be fit with one or more anti-lying bars. Anti-lying bars can be used to: (i) discourage an animal from lying down inside the feeding station; and (ii) encourage an animal to move through the feeding station. In one embodiment of the present invention an anti-lying bar may be installed on the base of the scale platform. An anti-lying bar or series of anti-lying bars or device of similar operation may also be installed at more than one position in the feeding station including without limitation the exit race assembly and entrance race assembly.

The present invention may be fitted with a means for controlling both the rate and mechanism by which the exit door closes once an animal passes through the exit door and exits the feeding station. The means for controlling the exit door may include without limitation (i) a damping brush; or (ii) a gas spring damping cylinder.

The present invention may be used in a variety of feeding configurations including without limitation (i) scheduled feeding; (ii) limited feeding; (iii) ad libitum "free-feeding"; or (iv) any combination of feeding configurations. In one embodiment of the present invention each animal is tagged with an RFID tag. The RFID antenna recognizes the individual animal as it visits the electronic feeding station according to its unique RFID tag. The feed intake of each individual animal may be recorded as it visits the electronic feeding station. The individual weight of the animal may also be recorded as the animal visits the electronic feeding station. The controller software may maintain a database of information collected from the electronic feeding station for each individual animal.

In another embodiment of the present invention each animal is tagged with an RFID tag. Each animal is allotted a known amount of food per day based on the information associated with the animal's RFID tag and stored on the electronic feeding station controller. An animal enters the entrance race of the electronic feeding station through the one way entry gate. An infrared detector or some other mechanism detects the animal and follows the animal's entry into the entrance race of the electronic feeding station. Once the animal's body is inside the entrance race assembly the one way entry door will close by the use of some means including without limitation a pneumatic controlled mechanism. Once the one way entry door closes the animal has a known time which has been programmed into the controller in which the animal's RFID tag must be read by the RFID antennae. If the animal's RFID tag is not read by the antenna before this time expires the one-way entry gate will open and allow another animal to enter the entrance race assembly of the electronic feeding station. If the animal's RFID tag is read before the timer expires the controller will operate a feed motor which drives a cup dispenser. Feed is delivered to the animal by the cup dispenser in small portions of about 100 gm (0.22 lb) per portion, but may be adjustable to deliver any portion without limitation. The feed portions are spaced at 30 to 45 second intervals to match the eating speed of the animal, but may be adjusted without limitation. This cycle continues until either the animal reaches its daily allotment of food or at the next periodic RFID reading the animal is no longer in the electronic feeding station. Once the animal reaches its daily allotment of food the one-way gate will open and allow another animal to enter the entrance race assembly.

The present invention may be fitted with one or more load cells or means for measuring the weight of the animals inside the feeding station. In the illustrated embodiment of the present invention the load cell assembly is mounted to the top channel of the linkage assembly. In this embodiment potential problems associated with positioning load cells near, on, or under the scale platform may be minimized or removed. Having the load cells near, on or under the scale platform may lead to debris buildup or fouling, including without limitation manure or bedding, thereby interfering or reducing the ability of the load cell to function properly and accurately measure the weight of the animal. By positioning the load cell and load cell assembly above the scale platform, the load cell is also in a location where it may remove or reduce the probability that it may be damaged by the animal.

The present invention can be fitted with one or more feed troughs. The benefits of multiple feed troughs include without limitation (i) segregation of food to selected animals or groups of animals; and (ii) reduction in labor costs required to refill feed troughs.

The present invention can be fitted with one or more feed trough switches or bin level switches. The feed trough or bin level switches may be used for the following purposes: (i) notifying operators that the feed troughs need to be manually replenished with feed; or (ii) operating a mechanism for automatically replenishing the feed troughs with feed from a larger storage container or bin.

The present invention can be fitted with one or more training boxes. The training box allows the farmer or researcher to manually control the operation of the electronic feeding station for processes including: (i) initial animal training; (ii) animal retraining; (iii) employee training; and (iv) monitor proper equipment functioning including maintenance and preventive maintenance tasks.

The present invention can be fitted with a medication dosing unit.

The present invention may be fitted with a water dosing unit.

The present invention may be fitted with a mechanism for encouraging or physically moving an animal out of the feeding station once the animal has reached its daily feed allotment including without limitation any mechanical, physical, electrical, chemical, visible, or audible mechanism. This mechanism could be engaged either before or after the entry door opens or closes.

The present invention may also be used or incorporated into a livestock management system that sorts animals for split-weight feeding based on a calculated median weight of the herd. Methods for sorting animals for split-weight feeding based on a calculated median weight of the herd are known and are described in U.S. Patent Application Publication No. 2003/0226522 and U.S. Pat. No. 7,210,428, the contents of each of which are incorporated herein by reference. In addition, other means for livestock management are also known and are described in U.S. Pat. Nos. 6,135,055 and 5,673,647, the contents of each of which are incorporated herein by reference.

The present invention may also be used with the following as described in U.S. Pat. Nos. 6,199,511; 5,924,922; D285, 498; 4,462,338; 4,353,329; and 4,303,039, the contents of each of which are incorporated herein by reference.

The present invention may also be used with the following as described in the U.S. Patent Application Publication Nos. 2006/0202835; 2003/0226522; 2003/0226518; 2007/0277748; 2007/0193523; and 2005/0028752, the contents of each of which are incorporated herein by reference.

The present invention may also be used with any tracking or monitoring device or similar technology including without limitation barcode, GPS (Global Positioning System), or RFID (Radio Frequency Identification) or any combination thereof.

The present invention may be used with any computer hardware and software operating system including without limitation Unix, Linux, Linux Variants, MacOS, MS-DOS, IBM OS/2 Warp, or Microsoft® Windows.

The present invention may be used with any heating device that may be used to provide heat to the animals including without limitation heating lamps and heating pads and methods for controlling these heating devices including without limitation those described in U.S. Pat. Nos. 5,730,355; 6,177, 271; 6,666,816; 6,981,649; and 7,516,905, and U.S. Patent Application Publication Nos. 2002/0147381 and 2006/0016899.

While the invention has been specifically described in connection with specific embodiments thereof, it is to be understood that this is by way of illustration and not of limitation, and the scope of the application should be construed as broadly as the prior art will permit.

What is claimed is:

1. An electronic livestock feeding station comprising:
a one-way entry gate that restricts entry into the feeding station to one animal at a time, and a one-way exit gate that prevents entry of other animals as the animal within the feeding station leaves the feeding station;
a feed dispensing mechanism that selectively dispenses an allotted amount of feed to an animal within the feeding station;
a scale assembly for individually weighing animals within the feeding station; and
a control system for controlling said feed dispensing mechanism based in part on input from said scale assembly;
wherein the scale assembly comprises a basket assembly having a platform, a back panel, and a front panel to ensure that an accurate weight measurement can be made even if an animal is leaning against a back or front side of the station.

2. The electronic livestock feeding station according to claim 1, further comprising an entrance race assembly, an exit race assembly, and a feeder for receiving feed dispensed from said feed dispensing mechanism, said entrance race assembly being arranged at an angle relative to said exit race assembly with said feeder located at an intersection between the entrance and exit race assemblies.

3. The electronic livestock feeding station according to claim 2, wherein said scale assembly is located in said entrance race assembly.

4. The electronic livestock feeding station according to claim 1, further comprising at least one sensor for detecting the presence of an animal within the feeding station, and a radio frequency identification antenna positioned near the feed dispensing mechanism.

5. The electronic livestock feeding station according to claim 4, wherein the sensor is an infrared detector positioned near the entry gate.

6. The electronic livestock feeding station according to claim 1, further comprising a platform extension that extends in a cantilever fashion past said feed dispensing mechanism to ensure that an accurate weight measurement can be made while an animal is accessing feed in said feeding station.

7. The electronic livestock feeding station according to claim 1, wherein the scale assembly comprises a basket assembly comprised of a removable animal enclosure panel.

8. The electronic livestock feeding station according to claim 1, further comprising a first swing gate assembly having a first gate panel which is selectively swingable between a first position in which animals in a first pen are allowed to pass through the first gate assembly into the feeding station and animals in a second pen are not allowed to pass through, and a second position in which the animals in the second pen are allowed to pass through the first gate assembly into the feeding station and animals in the first pen are not allowed to pass through.

9. An electronic livestock feeding station comprising:
a one-way entry gate that restricts entry into the feeding station to one animal at a time, and a one-way exit gate that prevents entry of other animals as the animal within the feeding station leaves the feeding station;
a feed dispensing mechanism that selectively dispenses an allotted amount of feed to an animal within the feeding station;
a scale assembly for individually weighing animals within the feeding station; and
a control system for controlling said feed dispensing mechanism based in part on input from said scale assembly;
further comprising an entrance race assembly, an exit race assembly, and a feeder for receiving feed dispensed from said feed dispensing mechanism, said entrance race assembly being arranged at an angle relative to said exit race assembly with said feeder located at an intersection between the entrance and exit race assemblies;
wherein said scale assembly is located in said entrance race assembly; and
wherein the scale assembly comprises a hinged scale platform and a cantilevered scale platform extension that extends past an end of the entrance race assembly and past the feeder to provide a weighing platform assembly that continues to hold an entire animal during normal feeding functions.

10. An electronic livestock feeding station comprising:
a one-way entry gate that restricts entry into the feeding station to one animal at a time, and a one-way exit gate that prevents entry of other animals as the animal within the feeding station leaves the feeding station;
a feed dispensing mechanism that selectively dispenses an allotted amount of feed to an animal within the feeding station;
a scale assembly for individually weighing animals within the feeding station; and
a control system for controlling said feed dispensing mechanism based in part on input from said scale assembly;
wherein the scale assembly comprises a hinged scale platform and a cantilevered scale platform extension.

11. An electronic livestock feeding station comprising:
an entrance race assembly defining an entrance raceway;
an exit race assembly defining an exit raceway arranged at an angle relative to said entrance raceway;
a feeder located at an intersection between the entrance and exit raceways;
a feed dispensing mechanism that selectively dispenses an allotted amount of feed into said feeder; and
a scale assembly for individually weighing animals within the feeding station, said scale assembly located in said entrance raceway.

12. The electronic livestock feeding station according to claim 11, further comprising at least one sensor for detecting the presence of an animal within the feeding station, and a radio frequency identification antenna positioned near the feed dispensing mechanism.

13. The electronic livestock feeding station according to claim 12, wherein the sensor is an infrared detector positioned near the entrance race assembly.

14. The electronic livestock feeding station according to claim 11, wherein the scale assembly comprises a basket assembly having a platform, a back panel, and a front panel to ensure that an accurate weight measurement can be made even if an animal is leaning against a back or front side of the station.

15. The electronic livestock feeding station according to claim 11, wherein the scale assembly comprises a basket assembly comprised of a removable animal enclosure panel.

16. An electronic livestock feeding station comprising:
an entrance race assembly defining an entrance raceway;
an exit race assembly defining an exit raceway arranged at an angle relative to said entrance raceway;
a feeder located at an intersection between the entrance and exit raceways;
a feed dispensing mechanism that selectively dispenses an allotted amount of feed into said feeder; and
a scale assembly for individually weighing animals within the feeding station, said scale assembly located in said entrance raceway;
wherein the scale assembly comprises a hinged scale platform and a cantilevered scale platform extension.

17. The electronic livestock feeding station according to claim 16, wherein the cantilevered scale platform extension extends past an end of the entrance raceway and the feeder to provide a weighing platform assembly that continues to hold an entire animal during normal feeding functions.

18. An electronic livestock feeding station comprising:
an entrance race assembly defining an entrance raceway;
an exit race assembly defining an exit raceway arranged at an angle relative to said entrance raceway;
a feeder located at an intersection between the entrance and exit raceways;
a feed dispensing mechanism that selectively dispenses an allotted amount of feed into said feeder; and
a scale assembly for individually weighing animals within the feeding station, said scale assembly located in said entrance raceway;
wherein the scale assembly comprises a basket assembly suspended by a linkage system, and a load cell located above the basket assembly and connected to the linkage system for measuring a weight of an animal during normal feeding functions.

19. An electronic livestock feeding station comprising:
an entrance race assembly defining an entrance raceway;
an exit race assembly defining an exit raceway arranged at an angle relative to said entrance raceway;
a feeder located at an intersection between the entrance and exit raceways;
a feed dispensing mechanism that selectively dispenses an allotted amount of feed into said feeder; and a scale assembly for individually weighing animals within the feeding station, said scale assembly located in said entrance raceway;

wherein the scale assembly comprises a basket assembly having a platform, a back panel, and a front panel to ensure that an accurate weight measurement can be made even if an animal is leaning against a back or front side of the station; and further comprising a platform extension that extends in a cantilever fashion past said feeder to ensure that an accurate weight measurement can be made while an animal is accessing feed in said feeder.

* * * * *